United States Patent [19]
Ujiie

[11] 3,746,833
[45] July 17, 1973

[54] PROCESS AND APPARATUS FOR TRIPLE-ELECTRODE MIG WELDING USING SHORT-CIRCUIT AND SPRAY-ARC DEPOSITION

[75] Inventor: Akira Ujiie, Kobe, Japan

[73] Assignee: Mitsubishi Jukogyo Kabushiki Kaisha, Tokyo, Japan

[22] Filed: Feb. 14, 1972

[21] Appl. No.: 226,055

[52] U.S. Cl.................. 219/137, 219/74, 219/130
[51] Int. Cl............................................. B23k 9/00
[58] Field of Search................ 219/137, 136, 131, 219/130, 73, 74, 76, 126

[56] References Cited
UNITED STATES PATENTS
3,617,690   11/1971   Terai et al. .................... 219/137
2,886,696   5/1959   Tuthill et al. ................... 219/137

Primary Examiner—J. V. Truhe
Assistant Examiner—George A. Montanye
Attorney—George B. Oujevolk

[57] ABSTRACT

A triple-electrode MIG welding process for the butt welding of I-grooves in flat position which comprises arranging three electrodes at the apices of a triangle, two of the electrodes preceding with a short-arc characteristic and one following said two with a spray-arc characteristic, and causing the two preceding electrodes to weld the groove walls by fillet welding while causing the following one electrode to weld and fill up the space between the beads formed by fillet welding, so that one weld layer is formed by three passes.

4 Claims, 7 Drawing Figures

PRIOR ART FIG. 1 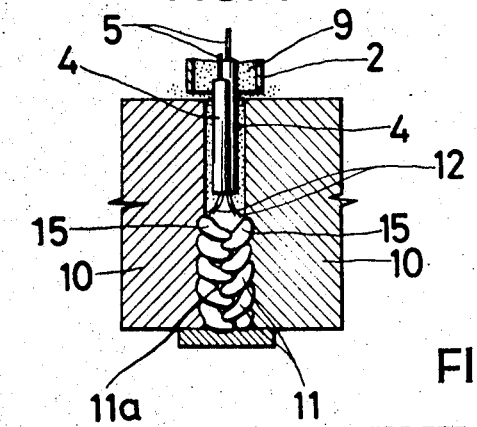

Patented July 17, 1973 3,746,833
2 Sheets-Sheet 2
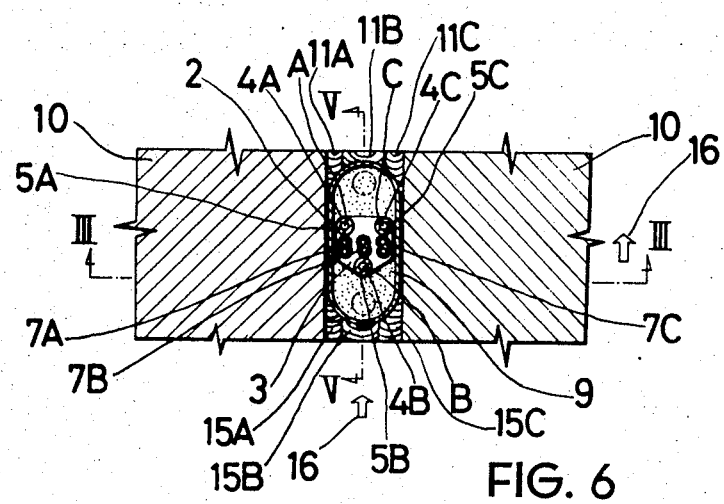
FIG. 4
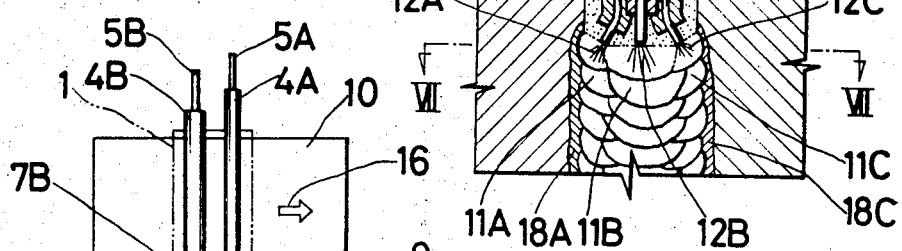
FIG. 5
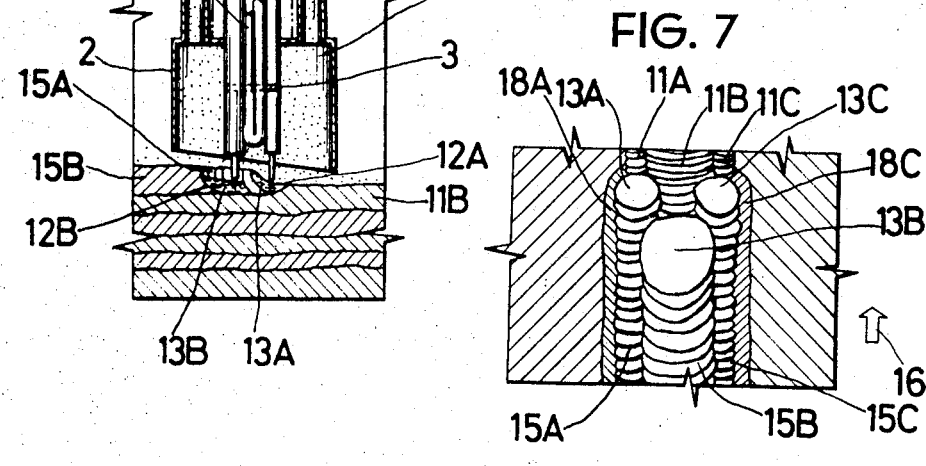
FIG. 6
FIG. 7

PROCESS AND APPARATUS FOR TRIPLE-ELECTRODE MIG WELDING USING SHORT-CIRCUIT AND SPRAY-ARC DEPOSITION

This invention relates to a process and apparatus for tripple-electrode MIG (inert-gas metal-arc) welding which may be employed with a high degree of efficiency for butt welding of thick plates, as in the fabrication of pressure vessels and the like for chemical engineering machines, prime movers, and atomic power plants.

While the butt welding of thick plates for the manufacture of such pressure vessels has in most cases been performed by submerged arc welding, a recent tendency is that, for improved efficiency and weld quality, either electro-slag welding or MIG welding is resorted to instead. However, the former which involves a large weld heat input necessitates thermal refining of the weld at elevated temperature following the welding. The latter is also disadvantageous in that defects tend to develop in the products particularly from the penetration contour peculiar to MIG welding. More recently, in an attempt at overcoming such difficulties, a one-layer-two-pass method using welding wires in tandem position has been proposed for "narrow-groove" welding, which requires less heat input than before with the use of small-size electrodes. Still, the proposed method when adopted for the welding of thick plates gives defects as illustrated in FIG. 1. According to the method, fillet welding of the groove walls is carried out by taking advantage of bending of welding wires 5 which are held tandem, in such a manner that one of the wires makes a pass first to be followed by the other. For perfect welding by the one-layer-two-pass procedure, the welding wire guide must be kept in acc-rate position under precision control. Otherwise, formation of acute-angled roots between weld beads 11, irregular fillet welds, inadequately fused portions 11a and/or other defects may result. In FIG. 2, the reference numeral 2 indicates a shield cup; 4, a contact tube; 9, inert gas; 10, base metal parts being welded together; and 12, welding arcs.

A variation of the method, in which a single welding rod of an ordinary size is used with a large current for a one-layer-one-pass procedure, has also been proposed. Here again, as shown in FIG. 2, a crack 11b may develop in the center of a bead 11 or an undercut may be formed in the groove wall, which in turn is likely to produce an inadequately fused portion 11a to disadvantage. If V-groove is used in an effort to avoid such undercut and crack, the increased groove width will cause corresponding increases in the metal deposition and in the development of welding strain.

Thus submerged arc welding has been widely used for the following principal reasons. Unlike MIG welding in which unshielded arc is employed, the welding is performed in flux within an ordinarily prepared groove, and therefore the process is adapted for an extended range of groove contours. The overlapping positions for the weld beads 15 may be set with less accurancy than in MIG welding, and yet fewer defects, such as undercut and insufficient fusion, result. Accordingly, sound welds are formed with a relatively high efficiency in automatic welding operation.

Now, considering the requirements for high-efficiency, high-quality butt welding of thick plates, the following conclusions are reached:

1. Multilayer welding gives high-quality welds without any finishing treatment as compared with the welds obtained by a monolayer welding, as electro-slag welding, with uses a large heat input.
2. Within the range of heat quantity sufficient for complete penetration, the smaller the heat input for fusing the groove walls, the better the quality of the resulting weld will be.
3. From the viewpoints of welding strain and edge preparation, a parallel groove or I-groove is superior to V-groove.
4. Considering the lapping of weld beads, the one-layer-three-pass procedure permits the easiest welding operation and gives superior welds.
5. MIG welding which involves no necessity of slug removal renders multiple head welding feasible.

In view of the foregoing, it is a basic object of the present invention to eliminate the disadvantages of the conventional MIG welding technique.

Another object of the invention is to provide a tripple-electrode MIG welding process which is free from the disadvantages of the ordinary MIG process, and an apparatus therefor.

These and other objects, advantages and features of this invention will be better understood from the following detailed description taken in conjunction with the accompanying drawings showing a preferred embodiment thereof.

FIGS. 1 and 2 are detailed sectional views illustrating how welding is carried out in conventional ways;

FIG. 4 is a transverse sectional view of the weld shown in FIG. 3;

FIG. 5 is a sectional view taken along the line V—V of FIG. 4;

FIG. 6 is a longitudinal sectional view of a weld according to the present process, and FIG. 7 is a sectional view taken along the line VII—VII of FIG. 6.

Figure 2:
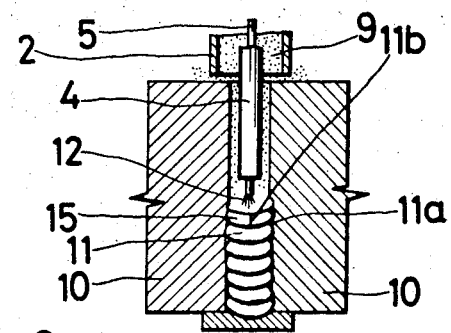
Figure 3:
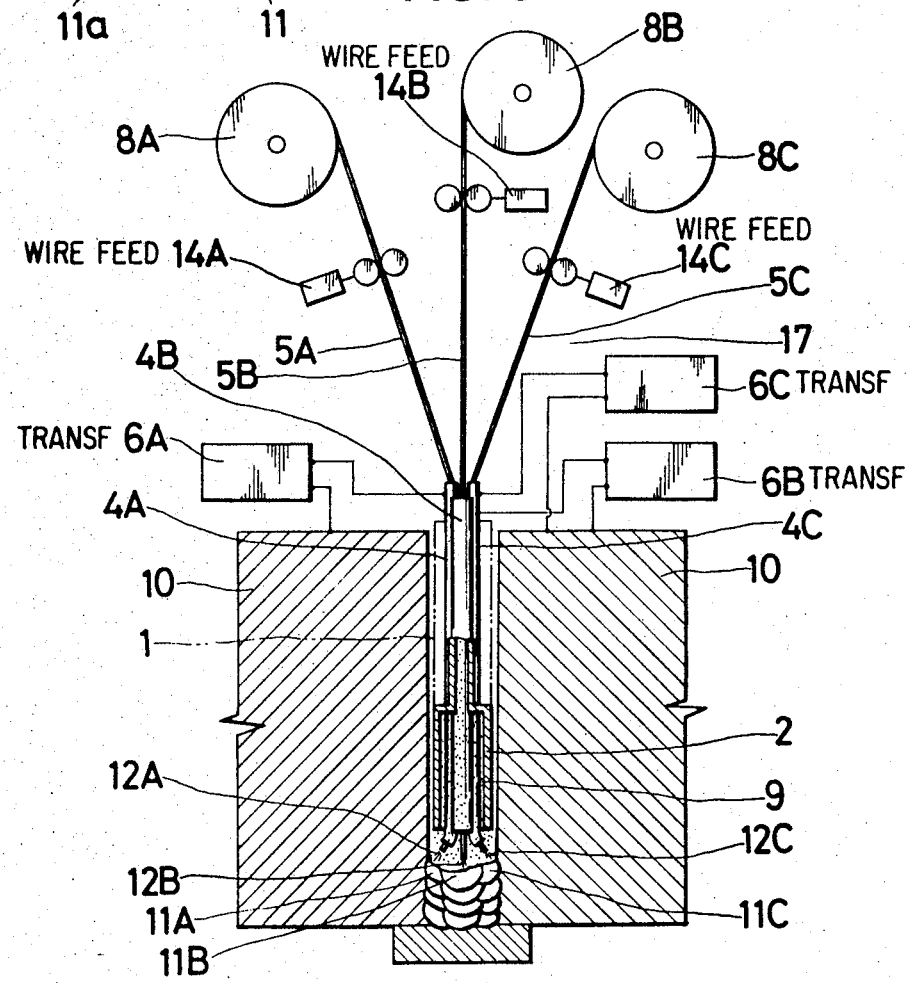
FIG. 3 is a sectional view, taken along the line III—III of FIG. 4, of a MIG welding apparatus adapted for practicing the process of the invention.

Reference will be first made to FIGS. 3, 4 and 5 which illustrate a MIG welding apparatus adapted for practicing the process of the invention. Within a same shield cup 2 of a welding torch 1 are provided three contact tubes 4A, 4B and 4C at the apices of a triangle through an insulating plate 3 as a spacer. The triangle, in the embodiment shown in FIG. 4, is approximately isosceles. The contact tube 4B is straightly extended whereas the other two 4A and 4C are bent at the tip toward the groove walls to be welded. These contact tubes are independently formed so as to accommodate welding wires 5A, 5B and 5C which may or may not have the same size. To these welding wires are applied currents from independent welding transformers 6A, 6B and 6C, respectively. In order to avoid overheating during welding, the contact tubes 4A, 4B and 4C may be cooled, respectively, as by contact with parallelly arranged copper tubes 7A, 7B and 7C through which cooling water is circulated. The welding wires 5A, 5B and 5C are continuously paid out from independently supported reels 8A, 8B and 8C by means of their respective feeders 14A, 14B and 14C. In the atmosphere of inert gas 9 supplied into the shield cup 2, welding arcs 12A, 12B and 12C are formed between the tips of the welding wires 5A, 5B and 5C and the workpieces 10 being welded together or the weld beads 11A, 11B and 11C of the layer already welded, thereby to form separate molten pools 13A, 13B and 13C. In this way the tips of the welding wires 5A, 5B and 5C are melted with the mating edges of workpieces 10 and the preceding beads 11A, 11B and 11C of the already welded layer to give new, additional beads.

In accordance with the present invention, the direction in which the welding is to be carried out is so chosen that, in the triangle formed by the central points A, B and C of the contact tubes 4A, 4B and 4C as shown in FIG. 4, the welding direction 16 is represented by the perpendicular from the apex B to the base line A-C. A welding head 17 including a welding torch 1, welding wire feeders 14A, 14B and 14C, etc. and a group of welding wire reels 8A, 8B and 8C, on one hand, and workpieces 10 to be welded together, on the other hand, are separately mounted on stationary or movable bases or carriages not shown, and the welding is performed by moving such bases or carriages with respect to each other at speeds that best meet the particular welding requirements.

Usually in butt welding, a MIG welding machine of socalled short arc type in which the welding transformers 6A and 6C and welding wire feeders 14A and 14C for the welding wires 5A and 5C, respectively, have the same functions is used. On the other hand, the welding transformer 6B and welding wire feeder 14B for the welding wire 5B belong to what is called a spray arc type welding equipment.

As noted above, the welding wires 5A, 5B and 5C are located at the apices of the approximately isosceles triangle. However, because the essence of the present invention resides in the fact that the space between the fillet welds by the two preceding welding wires 5A and 5C is filled up with the weld by the following wire 5B, it is possible to use a scalen triangle, instead, without departing from the scope of this invention. Thus, the welding wires 5A and 5C are as fine as about one millimeter in diameter whereas the wire 5B is of an ordinary size larger than the other two. Naturally the welding with the wires 5A and 5C is followed by that with the wire 5B.

In case of I-groove welding of thick plates by the triple-electrode MIG welding in accordance with this invention, the welding wires 5A and 5C are bent at the tips of the contact tubes 4A and 4C, as shown in FIGS. 6 and 7, at an angle of about 45 deg. from their respective perpendiculars. Then, fillet welding is carried out to form, as shown, weld beads 15A and 15C in the corners defined by the groove walls and the weld beads 11A, 11B and 11C of the layer already welded. At the same time, the welding wire 5B passes through the contact tube 4B and advances while welding the space between the fillet weld beads 15A and 15C with the bead 15B. In this way one layer is formed with three passes of wires which gives beads 15A, 15B and 15 C in the I-groove. This process is known as one-layer-three-pass welding.

Under the invention, as already noted, the weld beads 15A, 15B and 15C are formed independently of one another, although they are simultaneously produced. Particularly the beads 15A and 15C, which are formed by the short arc welding with fine welding wires, do not require much weld heat input. Accordingly, the workpieces 10 are little melted and the heat affected zones 18A and 18C of the base metals are limited. With these features the technique is advantageously applied to the welding of normalized metals (e.g. HT metals) and easily hardenable materials. The weld bead 15 does not have any unfavorable effect upon the workpieces 10 even if a large current is used for an improved welding efficiency, because the heat of welding is conducted to the base metal pieces 10 through the weld beads 15A and 15C. Moreover, the weld beads 15A, 15C and the zones 18A, 18C of the base metal pieces affected by the heat of welding for forming those beads are obtained by welding unher preset working conditions, so that, in effect, a heat treatment for annealing or tempering can be accomplished by heating to a suitable temperature.

A further advantage of the welding process according to the invention is that it enables hardenable materials to be welded as well without preheating or postheating. This is because, when the weld beads 15A, 15C are formed by welding, without preheating, they are immediately followed by the bead 15B, and therefore the effects of refining and postheating are achieved, which in turn precludes hardening crack. The bead 15B is itself protected, too, against hardening crack by the preheating effect of the beads 15A, 15C. Thus, by resorting to the welding process of the invention, it is possible to accomplish the welding of hardenable materials without preheating and postheating and yet with more than the effects of such treatments. Still another advantage of the invention is that, since thick plates are welded in multiple layers in accordance with the present invention, the structures of the base metal to be welded can be finely controlled just as in conventional multilayer welding, and therefore the subsequent heat treatment, such as annealing or stress relieving after welding, can be omitted or limited. The weld beads 15A, 15C may be simply formed by fillet welding. While the ordinary narrow-groove welding can lead to insufficient fusion between beads, the present process permits the welds to be produced by mere fillet welding and hence the welding arcs 12A, 12C are kept highly stable. In forming the weld bead 15B, the bottom defined between the beads 15A, 15C is filled up by spray arc welding. In other words, the welding proceeds on a flat surface which is easier to weld than a corner is, and sufficient preheating is effected. Because the arc atmosphere (as ionized) is better than for the previous beads 15A, 15C, a stable arc is obtained and an ideal penetration contour results from the change of the bottom upon fusion. These passes are repeated layer after layer in the same manner, and the welding torch 1 may be positioned on the basis of the groove center. Consequently, automatic operation is made possible with improved efficiency.

Inasmuch as the process of the invention permits welding of parallel edges (I-groove), machining is not essential for edge preparation; the edges may be just as cut by gas flame. The weld beads 15A, 15B and 15C are formed, respectively, of molten pools 13A, 13B and 13C which are independent of one another, and accordingly the points where the molten metal is to deposit have broad tolerances. For this reason a sound weld is obtained on the groove surface which may be somewhat rough due to gas cutting. The welding strain is minimized because the I-groove is continuously welded with trios of beads each formed almost simultaneously in the one-layer-three-pass fashion.

What is claimed is:

1. A triple electrode inert-gas metal arc welding method, comprising the steps of:
   a. juxtapositioning spaced apart metal plate members to be butt welded to form an I groove;
   b. disposing first, second and third welding electrodes adjacent said I grooves, said first and second electrodes forming the base of a substantially isosceles triangle, said third electrode forming the apex thereof, said base being disposed normal to the welding direction, said apex being towards said welding direction of travel;
   c. establishing a short circuit arc at said first and second electrodes and causing the arcs to weld at the desired position;
   d. establishing a spray-arc at said third electrode and causing beads to fall between the welding of said first and second electrodes;
   e. welding the walls of said I groove with said first and second electrodes by fillet welding weld beads leaving spaces between said fillet weld beads; and,
   f. filling up said formed spaces with spray welding from said third electrode.

2. In a metal arc inert gas welding apparatus for welding an I groove in a welding zone formed between two metal plates of a workpiece, said apparatus having wire support means and feeders to independently support first, second and third welding wire electrode pay-off reels, contact guide tubes for guiding the welding wire electrodes to the welding zone and means for supplying power to each of said first, second, and third welding wire electrodes, the improvement therein comprising: means arranging said first, second and third electrodes, at least at said welding zone to form a substantially isosceles triangle, said first and second electrodes being so disposed at said welding zone so as to form the base of the triangle normal to the direction of travel, each of said first and second electrodes being arranged adjacent to a wall of the workpiece at said I groove, said third electrode being disposed at the apex of said triangle towards the welding direction of travel, said means for supplying power comprising means for creating short-circuit arc deposition from said first and second electrodes and means for creating a spray-arc transfer deposition from said third electrode, and further including means for moving said electrodes relative to the I groove such that said first and second electrodes deposit spaced apart beads on each side of the walls of the I groove and said third electrode connects said beads with the spray-arc transfer deposit.

3. An apparatus as claimed in claim 2 including means causing the tips of the first and second electrodes to be outwardly bent.

4. An apparatus as claimed in claim 2 including cooling water passages in said contact guide tubes.

* * * * *